April 9, 1935. W. L. BADGER 1,996,988
METHOD AND MEANS FOR CONCENTRATING SOLUTIONS
Filed Oct. 20, 1932
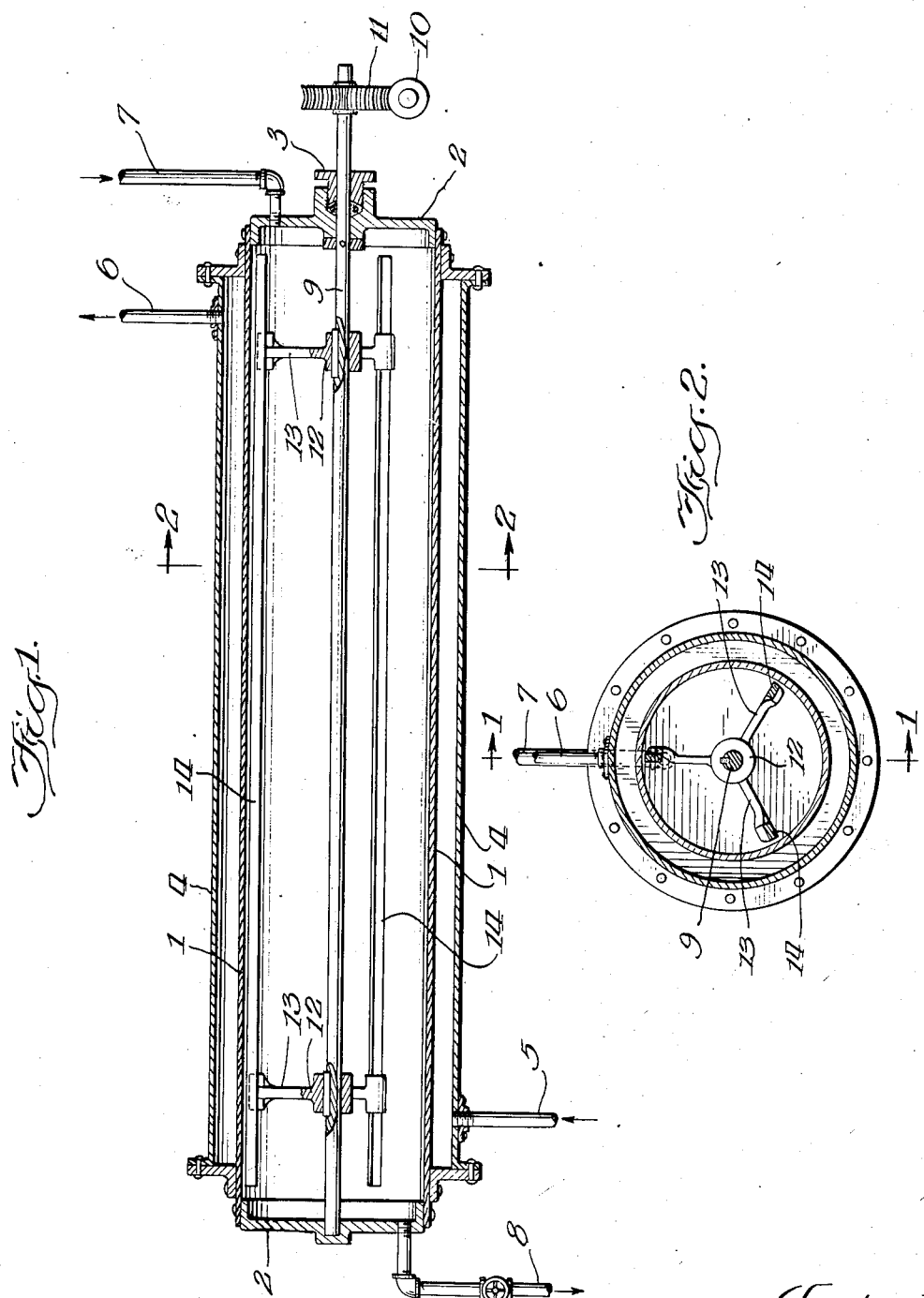
Inventor:
Walter L. Badger
By Williams, Bradbury, McCaleb & Hinkle
Attys Patented Apr. 9, 1935

1,996,988

UNITED STATES PATENT OFFICE 1,996,988

METHOD AND MEANS FOR CONCENTRATING SOLUTIONS

Walter L. Badger, Ann Arbor, Mich.

Application October 20, 1932, Serial No. 638,714

6 Claims. (Cl. 62—124)

My invention relates to a method and means for concentrating solutions by freezing.

It is well known that many solutions may be concentrated by crystallization of the solvent through freezing and the removal of the crystals. Concentration by freezing the solvent is often preferable to concentration by boiling and evaporation because even with relatively high vacuums it is difficult to concentrate aqueous solutions at temperatures much below 110 to 120° Fahrenheit, and at such temperatures some materials are damaged. Thus, for example in the case of fruit juices, either the flavor or the vitamin content or both may be injured by such high temperatures, whereas neither is seriously injured by temperatures below freezing.

However, with types of freezing equipment heretofore used and proposed this method of concentration has been subject to several disadvantages. In some prior equipments the solvent freezes as a solid mass which is difficult to remove, particularly as a part of a continuous process, and in which considerable quantities of the dissolved material are occluded. In other equipments the freezing in solid masses is overcome by scraping the crystals from the cooled walls of the freezing chamber, but such treatment results in excessive occlusion of the dissolved material and in wide variations of crystal size and shape; and also requires excessive power to drive the scrapers and undue precautions to insure accurate fits between the walls and scrapers.

One of the objects of my invention is to provide an improved method or process for concentrating liquids by crystallizing the solvent through freezing.

Another object is to provide a process and equipment wherein the crystals may be formed of relatively uniform size and shape and with practically negligible occlusion of dissolved material.

Another object is to provide equipment which does not require a close fit between parts, such as between scrapers and cooling walls.

A further object is to provide equipment which is simple, reliable and relatively inexpensive to build, install and operate.

Other objects and advantages will hereinafter appear.

The accompanying drawing illustrates suitable apparatus for carrying out the foregoing objects.

In the drawing:

Fig. 1 is a longitudinal section through the apparatus, and

Fig. 2 is a section on the line 2—2 of Fig. 1.

The method and equipment will be explained in connection with the concentration of an aqueous solution in which case the crystals are ice; although it is to be understood that they are applicable for use in concentrating solutions that are non-aqueous.

As illustrated in the drawing, the cooling or crystallizing chamber comprises a cylinder 1 closed at the ends by suitable heads 2 and 3. Head 2 is equipped with a suitable bearing for supporting one end of an axially disposed rotatable shaft 4 and has associated therewith a stuffing box 5 to prevent leakage of solution around the shaft. Head 3 is provided with a suitable socket or closed bearing for supporting the opposite end of shaft 4. A jacket 6 surrounds cylinder 1, with sufficient space therebetween for the flow of a fluid cooling or freezing medium. The cooling medium may be supplied to the space between the cylinder and the jacket through an inlet pipe 7 and may be carried away to waste or to a suitable recooler through an outlet pipe 8. The liquid to be concentrated is passed to the interior of the cooling chamber through an inlet pipe 9, while the outlet pipe 10 affords a discharge for the mixture of crystals and concentrated solution. The crystals and concentrated solution may be subsequently separated in any desired manner. Spiders 12, each shown as having three radially projecting arms 13, are secured to shaft 4 so as to rotate therewith. These arms 13 carry long relatively narrow agitator blades 14. These blades do not contact with the wall of cylinder 1, and are therefore neither designed nor intended to scrape crystals therefrom. Shaft 4 may be driven in any suitable manner, such as by a motor (not shown) acting through a worm 15 and a pinion 16.

The clearance between the agitator blades 14 and the wall of cylinder 1 will depend upon the viscosity of the liquid being treated at the temperatures required for crystallization of its solvent. The speed of rotation of the shaft carrying the agitator blades will depend upon the diameter of the cylinder and the viscosity of the liquid solution being treated. For example, in the concentration of aqueous solutions and with a cooling chamber cylinder of an internal diameter of 24 inches a clearance of ⅜ in. between the agitator blades and the cylinder and a speed of rotation of 5 R. P. M. will give good results. In general, the smaller the diameter of the cylinder the lower may be the speed of the agitator blades for any given clearance; and the greater the viscosity of the liquid the greater should be the speed of the agitator blades and the less should be the clearance for a given diameter of cylinder.

In operation the cooling or freezing medium is supplied through inlet pipe 9, to the jacket surrounding the cooling chamber and is removed through the outlet pipe 8. With the chamber properly cooled and the agitator blades being properly driven the liquid to be concentrated is supplied to the cooling or crystallizing chamber through the inlet pipe 9. As the ice crystals form they tend to settle in the bottom of the cooling chamber, in case they are heavier than the liquid from which they are separated, but as the stirring blades rotate in proximity thereto the crystals are lifted and showered down through the unfrozen or uncrystallized solution. Thus the crystals grow while freely suspended in the liquid,—a condition conducive to the formation of relatively pure crystals (minimum occlusion) of uniform size and shape. The agitator blades do not scrape crystals from the cooling surface of the cylinder but the eddies which follow the blades displace the cooled solution nearest the wall and distribute it through the mass of liquid so that the growth of the ice crystals takes place actually throughout the bulk of the solution and little or none congeals as a solid mass upon the cooled surfaces. Crystals thus formed in suspension within the solution are relatively pure and uniform in shape and size and contain relatively little occluded solution. In addition the fact that the blades do not engage the surface of the cooling chamber makes it unnecessary to provide a close fit between the blades and the cooling wall. This is of importance in the reduction of the power required to operate the equipment and in reduction of machine work necessary to fabricate the equipment. It is of further and still greater importance in connection with equipment particularly adapted for treatment of some food products which require the use of enameled apparatus, since it would be very difficult to produce an enameled stirrer which could be made satisfactorily to scrape the inside of an enameled cooling chamber cylinder. The crystals thus produced together with the concentrated solution is discharged through the outlet pipe 10.

In the event that the crystals are lighter than the liquid from which they are separated the stirrers carry them downwardly from the upper region of the cooling chamber and release them in the lower region thereof whereupon, due to their buoyancy, they rise again through the body of the liquid, thus permitting the crystals to grow while freely suspended in the solution.

Having thus described the nature of my invention and illustrated an embodiment thereof, what I claim and desire to secure by United States Letters Patent is as follows:

1. A concentration-by-freezing apparatus of the class described comprising in combination a receptacle containing the liquid to be concentrated and having an externally refrigerated wall, a movably mounted blade in the receptacle extending substantially parallel with the wall and adapted to traverse substantially the entire included area of the wall, the blade extending toward the wall but terminating short thereof by a distance not less than the diameter of crystals forming on the wall, and means for moving the blade across the wall and out of contact therewith at a rate of speed sufficient to dislodge—by eddy currents or turbulence produced by the movement—crystals forming on the wall, but insufficient to cause a substantial breaking up of free crystals by turbulence.

2. A concentration-by-freezing apparatus of the class described comprising in combination a receptacle containing the liquid to be concentrated and having an externally refrigerated wall, a movably mounted blade in the receptacle extending substantially parallel with the wall and adapted to traverse substantially the entire included area of the wall, the blade extending toward the wall but terminating short thereof by a distance not less than the diameter of crystals forming on the wall, and means for moving the blade across the wall and out of contact therewith at a rate of speed sufficient to dislodge—by eddy currents or turbulence produced by the movement—crystals forming on the wall, but insufficient to cause a substantial breaking up of free crystals by turbulence, the blade being constructed and arranged for dispersing free crystals throughout the liquid.

3. A concentration-by-freezing apparatus of the class described comprising a horizontally disposed cylindrical receptacle, means for externally refrigerating the cylindrical wall thereof, a plurality of arcuately spaced blades mounted within the receptacle for rotation about the axis thereof, the blades extending substantially the length of the cylindrical wall, the blades extending toward the wall but terminating short thereof by a distance not less than the diameter of crystals forming on the wall, and means for rotating the blades to pass across the wall but out of contact therewith at a rate of speed sufficient to dislodge—by eddy currents or turbulence produced by the movement—crystals forming on the wall, but insufficient to cause a substantial breaking up of free crystals by turbulence, the blades being constructed and arranged to carry free crystals to the vertical region of the receptacle opposite from that at which they tend to collect by virtue of their specific gravity relative to that of the liquid.

4. The method of concentration by freezing which comprises placing the liquid to be concentrated in a receptacle having a refrigerated wall, and moving a blade across substantially the entire field of the refrigerated wall close to, but out of contact with, the wall by a distance not less than the diameter of crystals forming on the wall, at a rate of speed sufficient to dislodge—by eddy currents or turbulence produced by the movement—crystals forming on the wall, but insufficient to cause a substantial breaking up of free crystals by turbulence.

5. The method of concentration by freezing which comprises placing the liquid to be concentrated in a receptacle having a refrigerated wall, and moving a blade across substantially the entire field of the refrigerated wall close to, but out of contact with, the wall by a distance not less than the diameter of crystals forming on the wall, at a rate of speed sufficient to dislodge—by eddy currents or turbulence produced by the movement—crystals forming on the wall, but insufficient to cause a substantial breaking up of free crystals by turbulence, and simultaneously dispersing free crystals into the liquid.

6. The method of concentration by freezing which comprises placing the liquid to be concentrated in a receptacle having a refrigerated wall, and moving a blade across substantially the entire field of the refrigerated wall close to, but out of contact with, the wall by a distance not less than the diameter of crystals forming on the wall, at a rate of speed sufficient to dislodge—by eddy currents or turbulence produced by the movement—crystals forming on the wall, but insufficient to cause a substantial breaking up of free crystals by turbulence, and simultaneously carrying free crystals to the vertical region of the receptacle opposite from that at which they tend to collect by virtue of their specific gravity relative to that of the liquid.

WALTER L. BADGER.